A. E. BUCHENBERG.
ELECTRIC WELDING MACHINE.
APPLICATION FILED AUG. 19, 1908.
932,441.
Patented Aug. 31, 1909.
2 SHEETS—SHEET 2.
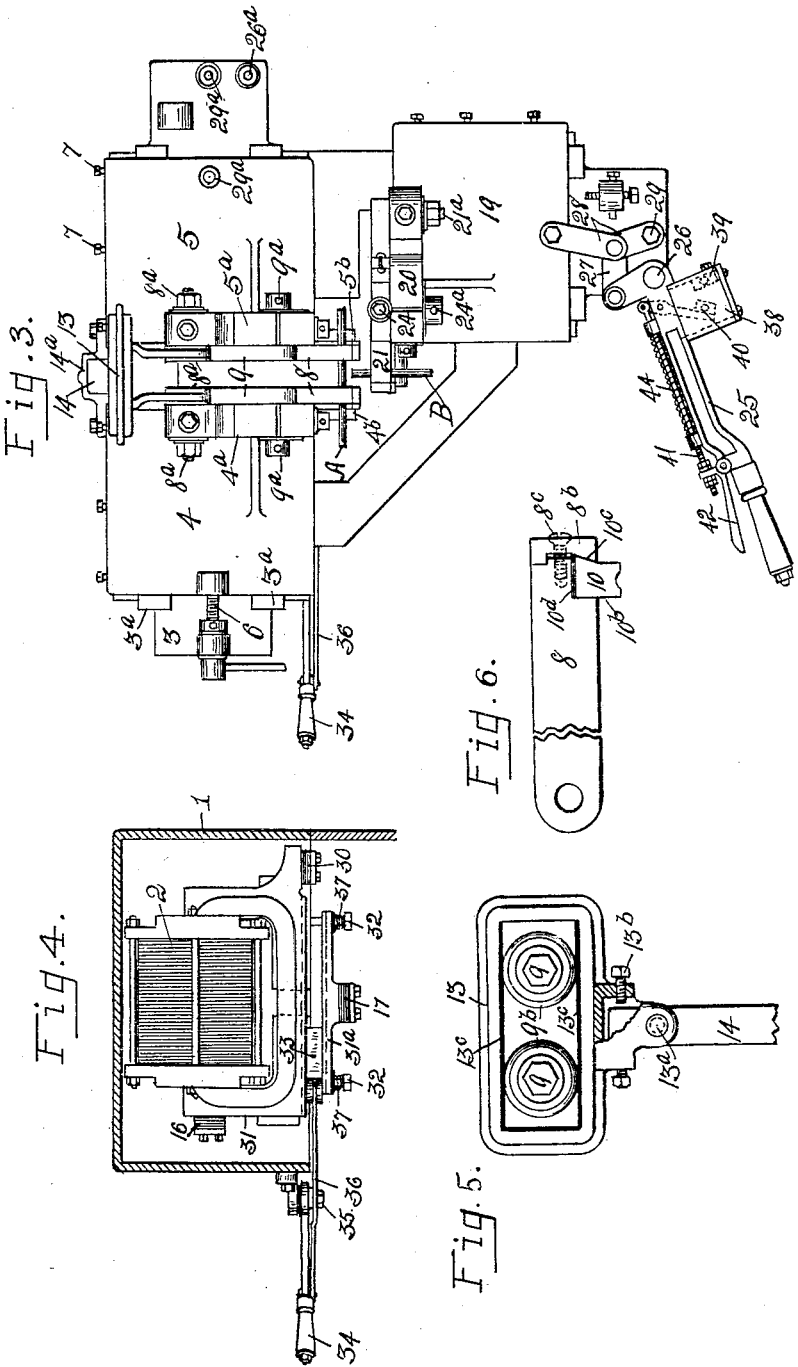
WITNESSES:
D. C. Walter
Hazel B. Huett
INVENTOR.
Alvin E. Buchenberg,
By Owen & Owen,
his attys.

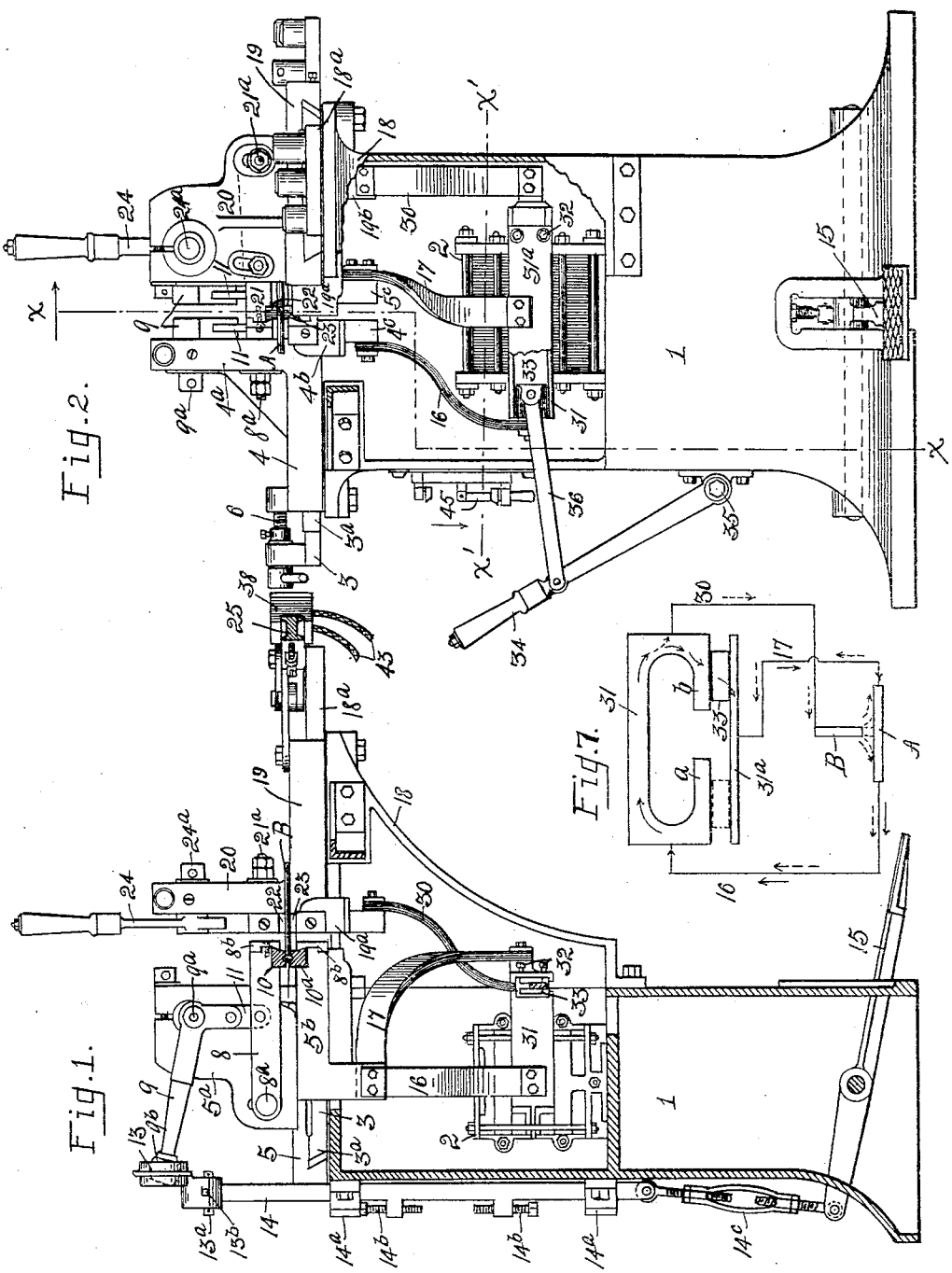

UNITED STATES PATENT OFFICE.

ALVIN E. BUCHENBERG, OF TOLEDO, OHIO, ASSIGNOR TO THE TOLEDO ELECTRIC WELDING COMPANY, OF TOLEDO, OHIO, A CORPORATION OF OHIO.

ELECTRIC-WELDING MACHINE.

932,441.   Specification of Letters Patent.   Patented Aug. 31, 1909.

Application filed August 19, 1908.   Serial No. 449,273.

*To all whom it may concern:*

Be it known that I, ALVIN E. BUCHENBERG, a citizen of the United States, and a resident of Toledo, in the county of Lucas and State of Ohio, have invented a certain new and useful Electric-Welding Machine; and I do hereby declare the following to be a full, clear, and exact description of the invention, such as will enable others skilled in the art to which it appertains to make and use the same, reference being had to the accompanying drawings, and to the figures and letters of reference marked thereon, which form a part of this specification.

My invention relates to electric metal-working apparatus of the class in which an electric current is used to reduce the metal to a semiplastic condition for the purpose of permitting the same to be forged, shaped, welded, or otherwise worked, as well understood in the art, and has particular reference to what is known as "double-welding" machines, or those adapted to electrically weld two or more articles together at angles to each, but the novel features thereof are not restricted to use in such connection.

One object of my invention is the provision, in association with a single transformer in a machine of the double-welding type, of means for directing the current from such transformer first to one and then to another set of work-clamping jaws during the welding operation, thus materially cheapening and simplifying the machine construction by eliminating one of the two transformers heretofore used in machines of this class.

A further object of my invention resides in the manner of securing the work-gripping jaws to their carrying parts to permit an easy and quick adjustment thereof as it may be desired to have the separate sets of jaws operate on work of different thicknesses, or for other purposes.

Further objects of my invention, as well as the operation, construction and arrangement of the parts thereof will be apparent by reference to the following description and to the accompanying drawings, in which,—

Figure 1 is a vertical section on the line *x x* in Fig. 2 of a machine embodying the features of my invention. Fig. 2 is a front elevation thereof with portions of the frame broken away and the table compression lever removed. Fig. 3 is a top plan view thereof. Fig. 4 is a transverse section of the frame on the line *x' x'* in Fig. 2. Fig. 5 is an enlarged rear elevation of the upper end of the treadle rod and its manner of connection with the jaw-carrying levers to adapt them to automatically adjust themselves to grip work of different thicknesses. Fig. 6 is an enlarged side elevation of a jaw-carrying lever and its jaw, and Fig. 7 is a diagrammatical view of the secondary of the transformer and its connection with the work.

Referring to the drawings, 1 designates the base or supporting frame of the machine, which forms a housing for the transformer 2, and is shown as having its top 3 provided with gibs $3^a$ for guiding the relative movements of the tables 4 and 5 thereon. These tables carry the work-holding parts, and when the machine is used for single welding, one table, which is designated 4, is preferably fixed to the support while the other is movable thereon to enable the tables to have relative movements toward and away from each other, as is customary in this class of apparatus. To facilitate an adjustment of the fixed table 4 to adapt it for different sizes of work it is mounted for sliding movement on the gibs $3^a$ and is adjusted by a turning of the adjusting-screw 6, which coöperates with it and the frame top 3 for such purpose. When the machine is used as a double-welder, as illustrated in the drawings, the table 5 is fixed to its support at a desired distance from the companion table 4 by setscrews 7 passing through its rear side and bearing against the associated gib $3^a$, as shown, or in any other suitable manner. Should the machine be used as a single-welder the requisite reciprocatory movements may be communicated to the movable table 5 by means of a lever or in any other suitable manner, as hereinafter described.

Rising from the inner or contiguous ends of the tables 4, 5 are the blocks or uprights $4^a$, $5^a$, respectively, each of which has a jaw-carrying lever 8 and an angled or bell-cranked lever 9 pivoted to its inner side for vertical oscillatory movements. Each lever 8 is pivoted to its block or upright, as at $8^a$, and carries a jaw or die 10 at its outer end for coöperating with a vertically registering companion jaw or die 10ª, which is carried by a subjacent portion 4ᵇ, 5ᵇ of the associated table, as shown in Figs. 1, 2 and 3, for clamping the work A to be operated on. The bell-levers 9 are pivoted to their respective blocks above the levers 8, as at 9ª, and have their short downturned arms connected to their respective levers 8 by links 11 and their long arms extending rearwardly and projected into the horizontally elongated opening of a yoke or saddle-member 13. This yoke or saddle-member is pivoted to the upper end of the treadle-rod 14, as at 13ª, see Fig. 5, to adapt it to have a vertical rocking movement relative to said rod as the varying thickness of an article being operated on, or of two articles held separately by each set of work-clamping jaws, may cause one lever 9 to move relatively farther than the other when the foot-treadle 15 is depressed to effect a clamping of the work. The oscillatory movement of the yoke 13 is regulated by set-screws 13ᵇ carried thereby coacting with the treadle-rod as shown. To prevent vertical play of the lever ends in the yoke 13 and at the same time permit them to have free universal movements therein, each is preferably provided at its end with a spherical-shaped anti-friction roller 9ᵇ for working in the yoke opening. These rollers are insulated from the yoke 13 by strips of insulation 13ᶜ as shown in Fig. 5. The treadle-rod 14 is guided for vertical reciprocatory movements by guide-members 14ª secured to the frame 1, and is shown as carrying two adjusting screws 14ᵇ, which coact with said guide-members to limit the movements of the rod. The rod 14 is also shown as being adjustably connected to the treadle 15 by the turn-buckle connection 14ᶜ.

The above feature of my invention which includes the provision of the saddle member 13 for permitting an automatic adjustment of the jaw-carrying parts is claimed in a copending application, Serial No. 485,957, filed March 26, 1909.

In order to facilitate an adjustment of the work-clamping jaws 10, 10ª transverse of their carrying parts, they are mounted in notches or incuts at the extreme ends of such parts and have their rear walls straight as shown at 10ᵇ, Fig. 6, and their forward or outer sides tapered at their bases, as shown at 10ᶜ, to adapt them to be engaged and held to their respective carrying parts by the correspondingly tapered end portions of clamps 8ᵇ, which are secured to said parts by screws 8ᶜ, or in any other suitable manner. The clamps 8ᵇ preferably have the ends thereof opposed to their tapered portions hooked to engage notches in the carrying-parts and thus coöperate with the screws 8ᶜ to hold the clamps in position. With this manner of holding the jaws an outward adjustment thereof may be easily effected by simply loosening the clamps 8ᵇ and placing shims at the base of the jaws, as shown at 10ᵈ, Fig. 6.

Heating currents of large volume but of low electro-motive force suitable for electric welding purposes are supplied to the tables 4, 5 and the clamping-jaws carried thereby from a suitable source of electricity, such as the transformer 2, through the leads 16 and 17, which have their upper ends each connected to one of said tables, as to a pendent portion 4ᶜ, 5ᶜ, thereof, respectively, and their lower ends connected to the secondary yoke or block of the transformer. It will be understood that the tables 4, 5 are insulated from the supporting frame 1 and its top 3 in a suitable manner.

To adapt the machine for use as a double-welder, or for joining one article to the side of another, I secure a bracket 18 to the front of the supporting frame 1 by bolts or in any other suitable manner, and mount a table 19 on its top 18ª for reciprocatory movements transverse to the movements of the tables 4, 5 on their ways.

The table 19 is similar in its construction and arrangement of clamping parts to the tables 4, 5, having the block or upright 20 at its inner edge, or that contiguous to the table 5, the lever 21 pivoted to said part, as at 21ª, and carrying the jaw or work clamping part 22, which coöperates with the lower jaw 23 that is carried by the projecting part 19ª of the table, all of which correspond to the like parts of the other tables. The jaw-carrying lever 21 of the table 19 is shown as having its clamping movements controlled by a cam-lever 24 which is pivoted to the upright 20, as at 24ª. The table 19 is disposed at one side of the space between the tables 4, 5, and preferably in advance of the latter so that its work gripping jaws 22, 23 lie in advance of such space, thus adapting an article B held thereby to have its inner end moved into abutment with an article A held by the clamping parts of the tables 4, 5, when the table 19 is moved for such purpose.

While the table 19 may be moved in any suitable manner the means shown for accomplishing such purpose comprises the angled or bell-cranked lever 25, which is pivoted to the bracket top in advance of the table, as at 26, and has its short arm connected by a link 27 to the inner or contiguous ends of the two toggle-links 28, 28, one of which is pivoted to the bracket top, as at 29, while the other is pivoted to the outer end of the table 19, as shown in Fig. 3. When the machine is used for single welding, the lever 25 and attached links are disconnected from the platform 18 and table 19 and mounted on the top 3 of the frame 1, with the lever pivoted to said top, as at 26ᵃ and the links 28, 28 pivoted to the frame top and table 5, as at 29ᵃ, see Fig. 3. By loosening the set-screws 7 in the table 5, it may now be moved as is customary in single welding machines.

In the operation of double-welding machines it is customary to first direct the heating current through one piece of the work, as the article A, by throwing the current to the two tables 4, 5, and when such article has been heated to the desired state to then switch the heating current to the other article, as B, which is placed with its end in abutment with the side of the article A by a movement of its table 19. For this purpose it has been the practice to employ two transformers, one for supplying current to one article and the other for supplying current to the two articles through a backing-up contact block. In order to accomplish with one transformer the functions of the two transformers heretofore used in machines of this class, I provide the transformer 2 with three leads, 16, 17 and 30, the first two of which connect with the tables 4 and 5, as above stated, while the latter connects with the table 19, as to a pendent portion 19ᵇ at its inner end. Two of the leads, as 16 and 30, are attached to opposite sides of the secondary yoke 31 of the transformer, while the third is attached to the central portion of a plate 31ᵃ which forms a part of the secondary and is carried by cap-screws or pins 32 projecting from the terminals $a$, $b$ of the yoke 31 to adapt it to span the space between such terminals, as shown. This plate is suitably insulated from the secondary 31, as by insulating bushings (not shown) encircling the screws or pins 32, and is spaced from the associated side of the secondary by a contact or conductor block 33 which is intended to slide longitudinally of said plate and secondary in complemental ways or grooves formed in their contiguous sides.

By reference to the diagram shown in Fig. 7, it will be apparent with this arrangement that when the block 33 is placed to the right of the lead 17, or in contact with the terminal $b$ of the secondary yoke, and the articles "A" "B" to be welded are in spaced position, as shown in full lines in the diagram, a current will flow from such terminal through the block 33, plate 31ᵃ, lead 17, article A and lead 16 back to the secondary yoke 31, as shown by the arrows in full lines, or vice versa, and when placed to the left of the lead 17 or in contact with the terminal $a$ of the yoke and the articles A, B are held in contact, a current will flow from one side of the yoke 31 through the lead 30 to the article B, and thence divide and flow in opposite directions through the article A and back to the secondary yoke in parallel through the leads 16 and 17, plate 31ᵃ and block 33, as indicated by the arrows in dotted lines, thus effecting a welding of said articles.

The movement of the block 33 is controlled by a lever 34, which is pivoted to the frame 1, as at 35, and connected to the block by a link 36, or it may be controlled in any other suitable manner. For the purpose of holding the plate 31ᵃ in yielding contact with the block 33 to compensate for wear and maintain perfect electrical contact between the plate, block and secondary, coiled compression-springs 37 are mounted on the screws or pins 32 intermediate their headed ends and the plate, as shown in Fig. 4, the springs being insulated in a suitable manner from the plate.

38 designates a switch-box which is carried by the table-compression lever 25, and contains the fixed contact 39 and the movable lever-contact 40, which latter is suitably pivoted within the box or to the lever 25 and has one end projected outwardly therefrom and attached to a rod 41, which is in turn attached to a hand-latch or controller-lever 42, which is pivoted to lever 25 near its outer end. The contacts 39 and 40 connect with the primary of the transformer through the leads 43, 43, shown in Fig. 1. The switch is normally maintained open by the coaction of the spring 44 with the rod 41. It is apparent that the mounting of the switch on the lever 25 enables the operator to close and open the same at the proper times in the welding operation and effect an interruption of the current as the welding action may require without removing his hand from the lever 25, thereby greatly facilitating the work of the operator.

The double-pole switch 45 at the left of Fig. 2 is for the purpose of changing the connections of the two primary coils of the transformer from series to parallel, or vice versa, to obtain higher or lower voltage of the secondary as the size of the work acted on may require, as one pole is for series while the other is for parallel connection.

The operation of the machine when used as a double welder is as follows: The article A being placed between the sets of jaws 10, 10ᵃ and clamped therebetween by a depression of the foot-treadle 15 and the article B being placed between the sets of jaws 22, 23 and clamped therebetween by a proper movement of the cam-lever 24, the operator places the contact block 33 intermediate the leads 17, 30 of the transformer or in contact with the terminal $b$ of the secondary yoke and then closes the switch 39—40 by pressing the controller lever 42, thus closing the circuit through the primary of the transformer and causing a current to flow from the secondary yoke through the block 33, plate 31ᵃ, article A and its carrying parts and back to the yoke through the leads 16, as indicated by the arrows in full lines in Fig. 7, it, of course, being understood that the articles A and B are separated during such operation. When the article A has been heated to the desired state of plasticity or semi-plasticity, the lever 34 is worked to move the contact block 33 in its ways from the right to the left of the lead 17 or in contact with the yoke terminal $a$, and the lever 25 is worked to move the table 19 so that the article B carried thereby has contact with the side of the article A, thus, when the switch 39—40 is closed, causing a heating current to flow from one side of the yoke 31 through the lead 30 to the article B, thence divide at the point of contact of the article B with the article A and flow in opposite directions through the article A and back to the secondary yoke in parallel through the leads 16 and 17, plate 31ª and block 33, as indicated in Fig. 7 by the arrows in dotted lines, thus effecting a welding of said articles.

I wish it understood that I do not desire to be restricted to the exact details of construction and arrangement of the parts of the invention shown and described, as obvious modifications will occur to persons skilled in the art; nor do I wish to restrict the different improved features thereof for use in connection with a particular type of electric-welding machine.

Having thus described my invention, what I claim as new and desire to secure by Letters Patent, is,—

1. In an electric welding machine of the class described, the combination of separate work carrying means, a single transformer having its secondary in connection with such means, and mechanism operative to cause the secondary current to flow through one of two articles held by said separate means, when such articles are spaced and through both when the articles are in contact.

2. In an electric welding machine of the class described, the combination of a work holder having spaced work gripping means, a second work-holder, said work-holders being capable of relative movements, a single transformer having its secondary in connection with said work-holders, and means operative to cause the secondary current to flow through an article held by one work-holder when such article is out of contact with an article held by the other work-holder or through articles held by both work-holders when the articles are in contact.

3. In a machine of the class described, the combination of a plurality of relatively movable sets of work-holders, a single transformer having its secondary in connection with the several sets of work-holders, and mechanism operative to cause the secondary current to flow through an article held by one work-holder when such article is out of contact with an article held by the other work-holder or through a plurality of the work-holders and articles carried thereby when the latter are in contact.

4. In a double electric welding machine, the combination with means for carrying separate articles to be welded together, of a transformer, a plurality of leads from the secondary of the transformer, and means for causing the secondary current to pass through one of the articles held by said means when such articles are spaced and through both articles when in contact.

5. In a machine of the class described, a plurality of work holding parts, a transformer having its secondary yoke provided with a spaced part, a plurality of leads connecting different work-holding parts of the machine with said yoke, and means in electrical contact with said yoke and spaced part and shiftable to throw the secondary part and through all of said leads when articles held by the several parts are in contact or through a portion of such leads when some of the articles held by such parts are not in contact.

6. In a machine for double electric welding, the combination with the work-carrying parts, of a transformer having its secondary block or yoke composed of two spaced parts, two leads from one and one lead from the other of said secondary parts to the work carrying parts, and means movable between said secondary parts for directing the secondary current through all or a portion of the work carrying parts when the pieces of work carried by said parts are in or are out of contact, respectively.

7. In a machine of the class described, the combination with the work-carrying parts adapted to carry two articles to be angularly welded, of a transformer, a plate carried at one side of the secondary block or yoke of the transformer, two leads connecting different portions of said block or yoke to the work carrying parts, a lead connecting said plate and a work-carrying part, a contact-block movable between said secondary yoke and plate whereby to direct the secondary current through one or both of the articles held by said parts, means yieldingly holding said plate in contact with said contact-block, and means for shifting the position of said contact-block for causing a current to flow through both work pieces when in contact or through one when such pieces are not in contact.

8. In a machine of the class described, a jaw-carrying part having its end provided with an incut, a jaw seated in said incut and having a tapered side, a clamp secured to the end of the jaw carrying part and having a tapered portion which coacts with the tapered side of the jaw to hold it in said incut, said jaw being capable of adjustment transversely of the carrying part by the insertion or removal of shims at its base.

9. In an apparatus of the class described, the combination with the table controlling-lever, and the transformer, of a lever-switch carried by said lever and in circuit with the primary of the transformer, a rod carried at the side of the lever and attached to the switch-lever, a hand lever pivoted to the outer end portion of the controller-lever and attached to said rod whereby when oscillated to effect an oscillation of the switch-lever, and means acting on said parts to normally maintain the switch open.

In testimony whereof I have hereunto signed my name to this specification in the presence of two subscribing witnesses.

ALVIN E. BUCHENBERG.

Witnesses:
C. W. OWEN,
CORNELL SCHREIBER.